United States Patent
Carruth, Jr.

[15] 3,687,229
[45] Aug. 29, 1972

[54] REPETITIVE LOW ENERGY SEISMIC SOURCE SYSTEM CONTROLLED BY DIGITAL TIMING MEANS

[72] Inventor: Henry Thomas Carruth, Jr., Houston, Tex.

[73] Assignee: Chevron Research Company, San Francisco, Calif.

[22] Filed: Dec. 21, 1970

[21] Appl. No.: 99,946

[52] U.S. Cl. .....................181/0.5 XC, 340/15.5 DP
[51] Int. Cl. ............................G01v 1/08, G01v 1/28
[58] Field of Search.........181/0.5 R, 0.5 DS, 0.5 XC; 340/12, 15.5 DP

[56] References Cited

UNITED STATES PATENTS

| | | |
|---|---|---|
| 3,058,540 | 10/1962 | Simpson...................340/12 R |
| 3,496,530 | 2/1970 | Brown et al. ........340/15.5 DP |
| 3,133,231 | 5/1964 | Fail et al. .............181/0.5 XC |
| 3,460,648 | 8/1969 | Brown et al. .......340/15.5 DP |

Primary Examiner—Benjamin A. Borchelt
Assistant Examiner—James V. Doramus
Attorney—A. L. Snow, F. E. Johnston, R. L. Freeland, Jr. and H. D. Messner

[57] ABSTRACT

Initiation, in sequence, of pulses of seismic energy from a selected depth within a shothole using elongated charges of explosive gas mixtures, is provided by a seismic source system including novel digital data responsive control circuitry controlling the initiation and duration of gas delivery as well as ignition of the gas in accordance with control signals generated using, as a source code, clock pulses and digital signals representative of multi-bit timing words, such as, for example, a nine- or 21-bit digital word.

4 Claims, 18 Drawing Figures

INVENTOR
HENRY THOMAS CARRUTH, JR.
BY Harold D. Misner
Ralph L. Freeland Jr.
ATTORNEYS

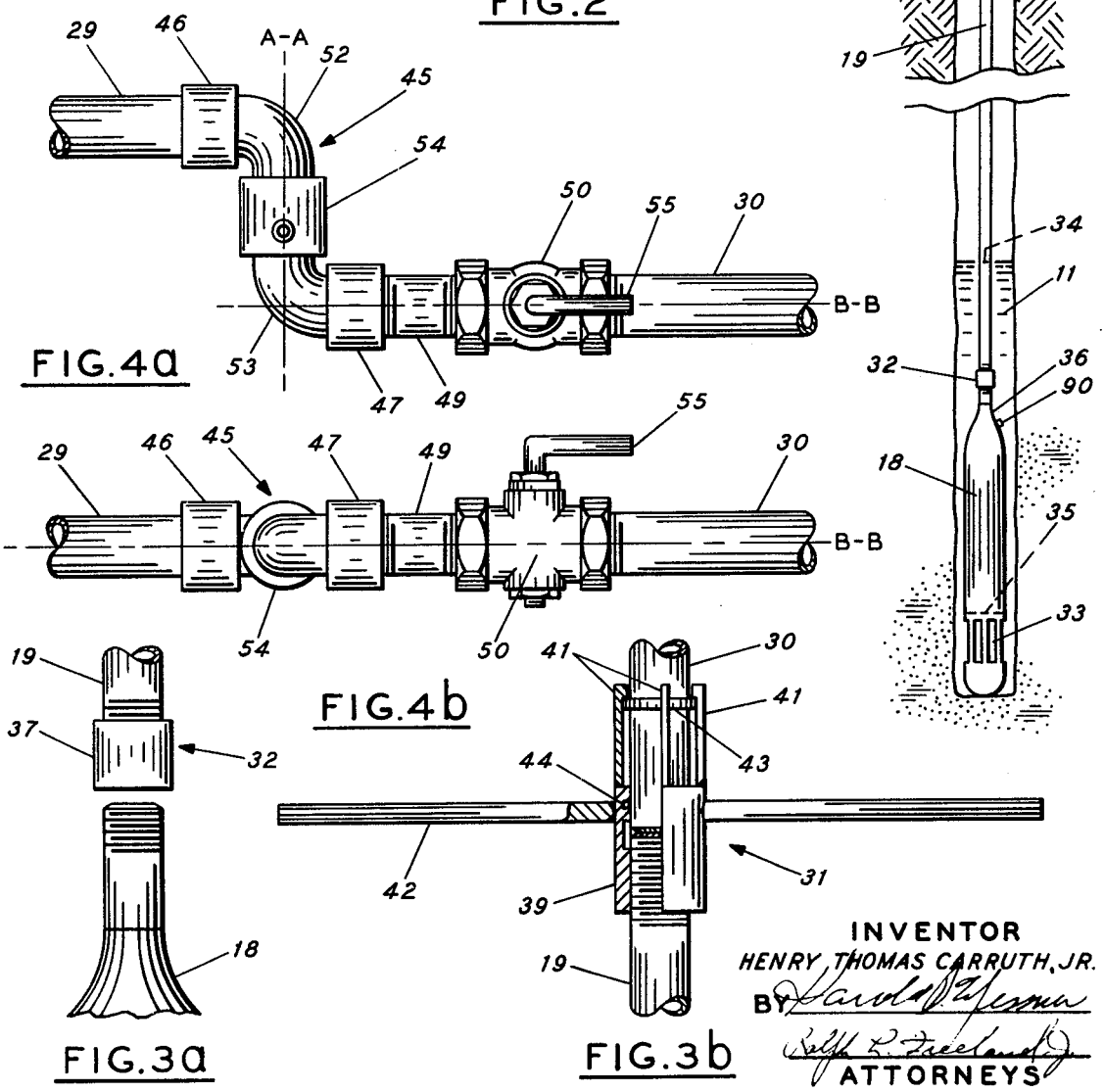

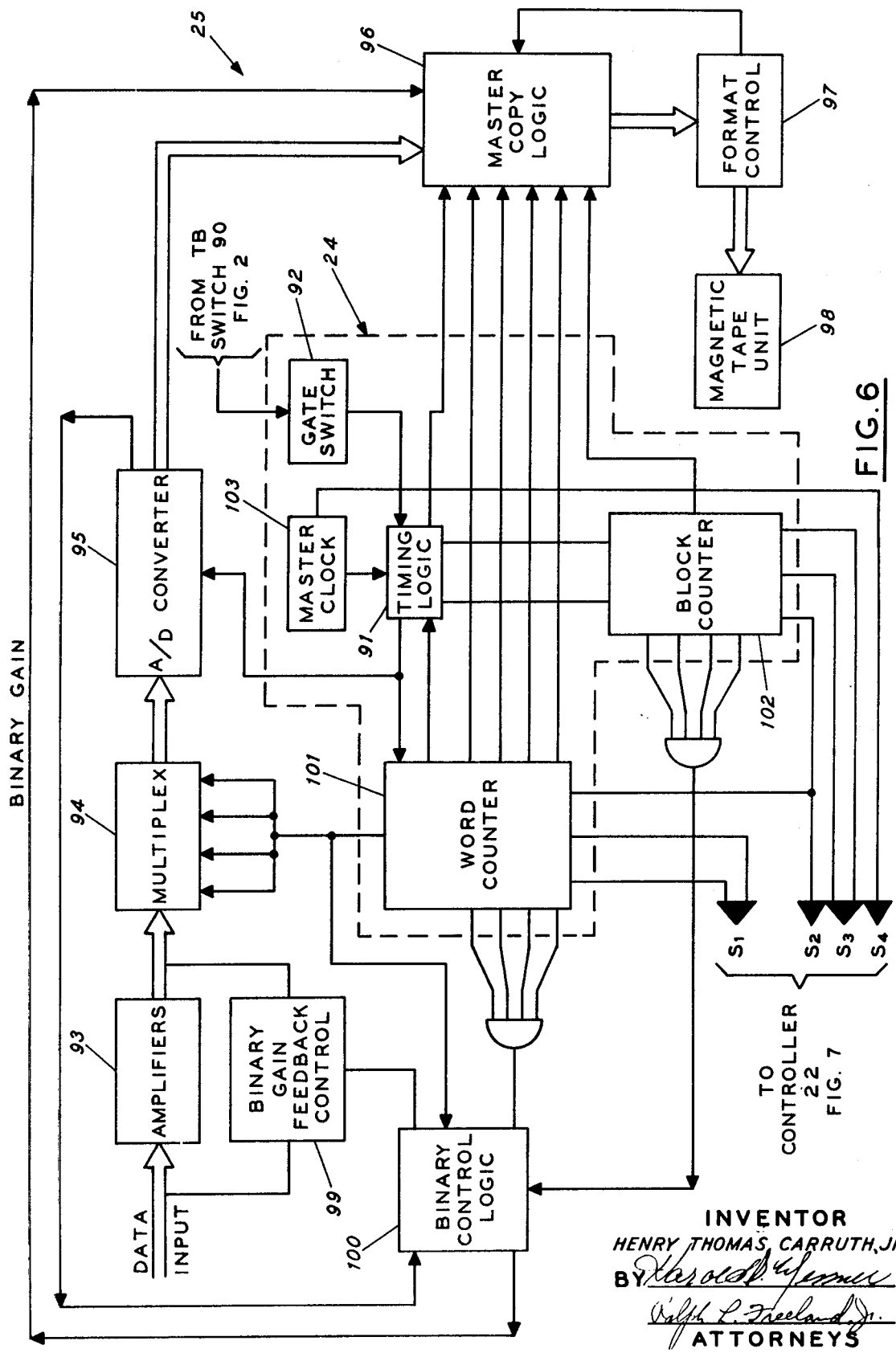

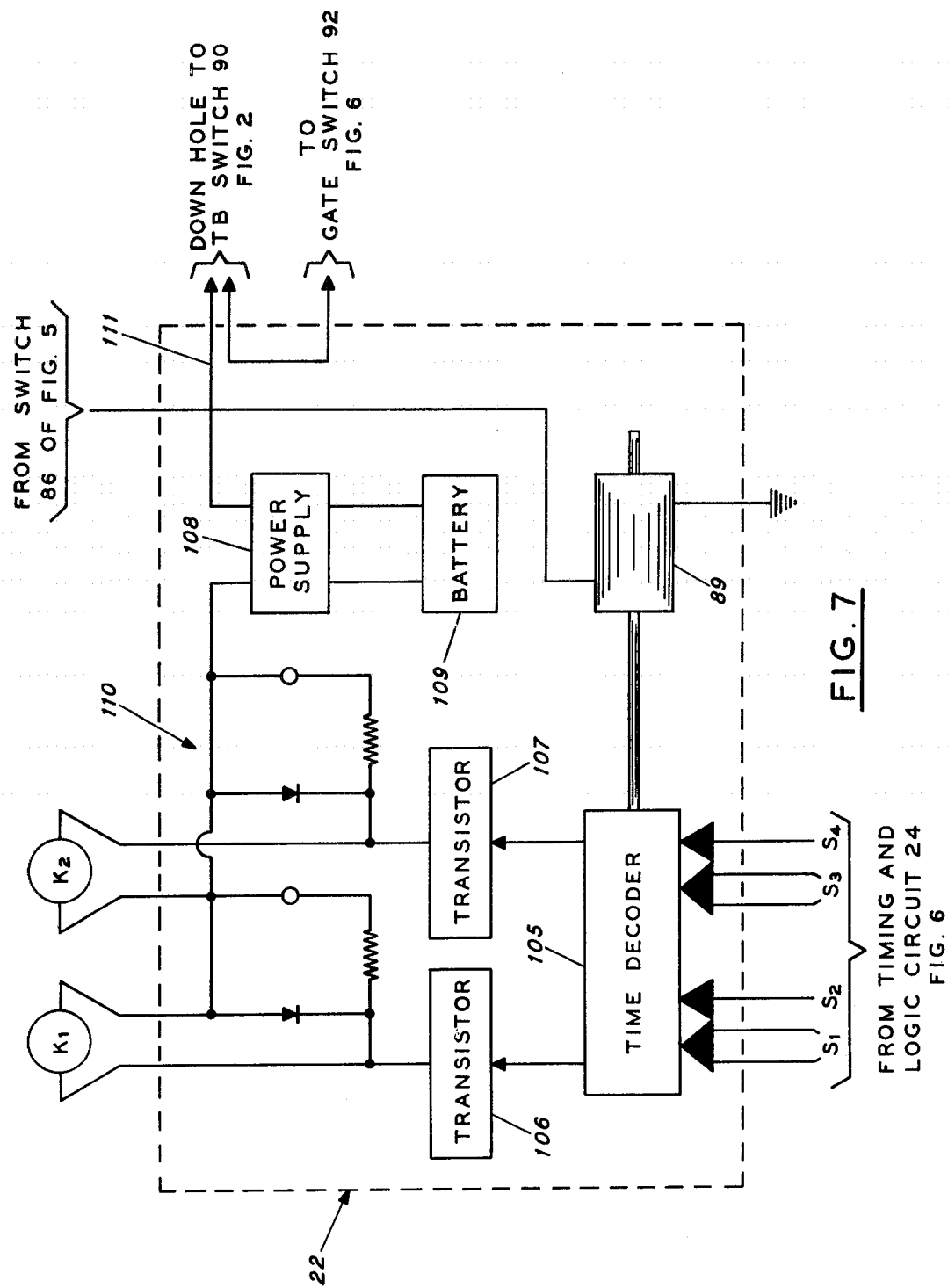

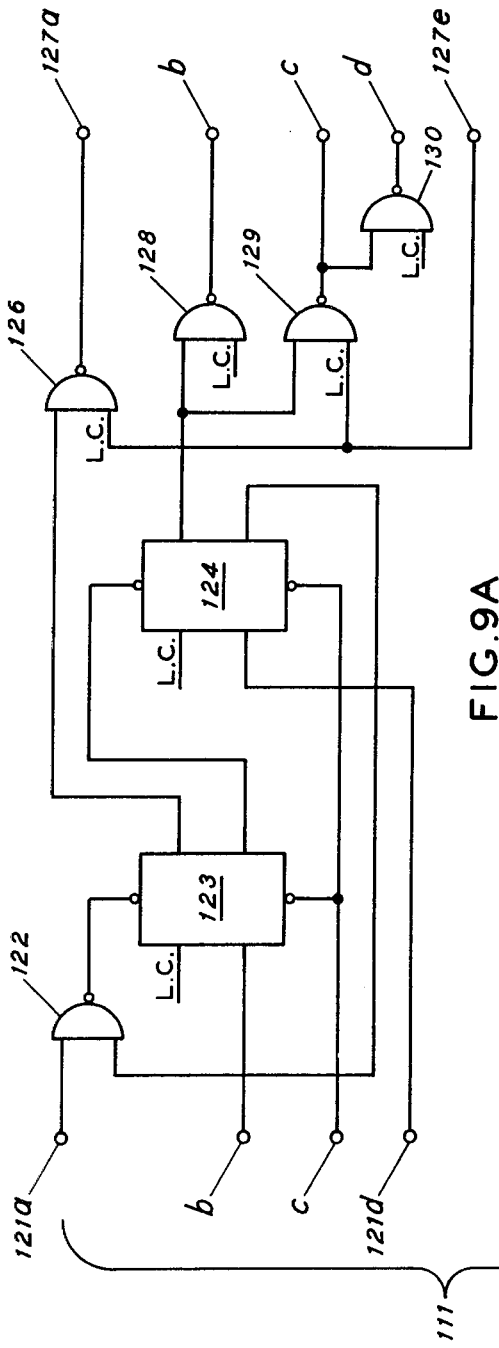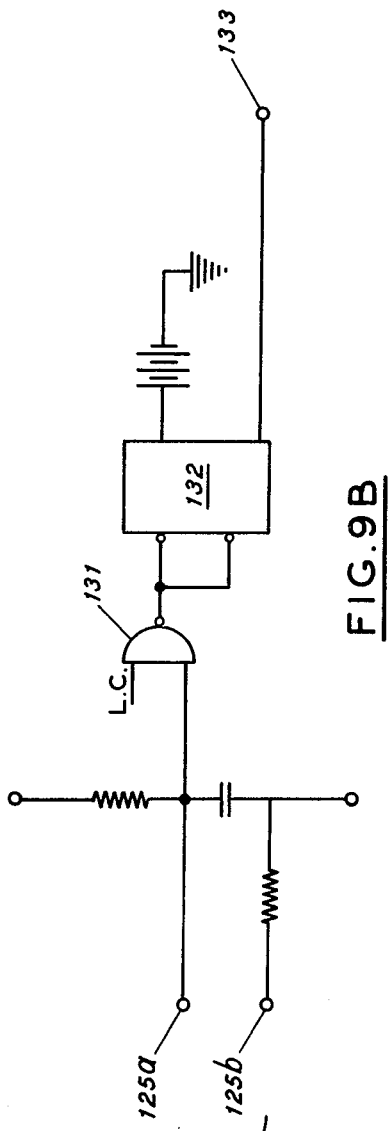
FIG.9A
FIG.9B

REPETITIVE LOW ENERGY SEISMIC SOURCE SYSTEM CONTROLLED BY DIGITAL TIMING MEANS

BACKGROUND OF THE INVENTION

1. Field of the Invention

This invention relates to a low energy gas seismic source system and, more particularly, to repetitive seismic source operative by data digital control circuitry, for the initiation of the delivery of elongated charges of explosive gas mixtures to a selected depth within a shothole followed by ignition of gas charges to generate pulsed seismic energy repetitively.

In accordance with the present invention the digital data responsive control circuitry controls duration of deliverence of the gas charges as well as time (occurrence) of ignition of each charge in accordance with a digital time source code generated at a remote location, as in a recording truck, and includes, at the shooting truck, time decoding means for decoding the time code so as to control first and second relay means connected to the delivery means and the ignition means of the system. Remotely located time code generating means can also include gate means conditionally connected to time break generating means of the seismic source which enables the gate means for a selected time interval after the seismic energy has been initiated in the shothole. In that way, digitizing and recording equipment within the recording truck can be energized to digitize and record seismic reflections of the generated seismic energy.

2. Description of the Prior Art

In geophysical seismic prospecting, a seismic wave is initiated at or near the earth's surface and travels downwardly into the earth formation. After encountering interfaces formed between different subsurface strata, a portion of the energy is reflected back towards the earth's surface. As is well known, after the reflected energy has been detected, travel time of the wave can directly be related to the depth of the reflecting interfaces.

Heretofore, dynamite has been used to generate seismic waves, usually by detonation in relatively shallow shotholes drilled into the earth. The depth at which detonation occurs is normally from 50 to 100 feet, so as to preferably be below the surface layer which is commonly referred to as the "weathered layer" of the formation. In that way, problems associated with wave propagation within the weathered layer are significantly diminished (normally the seismic wave within the weathered layer propagates at a much lower velocity than that in formations beneath the weathered layer).

Adjacent to the shothole, a geophone spread can be positioned in a particular orientation with respect to the source points to receive the seismic reflections in a manner allowing later enhancement by conventional seismic enhancement techniques, such, for example, as "common depth point stacking (CDPS)." (In CDPS, traces associated with common center points can be algebraically added to enhance the informational signal characteristics within the records; in the collection process, a particular source-geophone spread configuration is utilized for the specific purpose of surveying the same subsurface area many times.) Where dynamite charges are repeatedly used to provide multicoverage of the same subsurface area, using the same shothole, at the same detonation depth, the shothole itself can become mechanically altered.

That dynamite is not the only method of generating seismic disturbances is well known. Repetitive (analog controlled) gas seismic sources are the subject of U.S. Pat. Nos. 3,055,450 and 3,058,540 in which repeated ignition of a combustible gas mixture within a vertically oriented pipe carried aboard a boat is employed to produce repetitive seismic impulses for surveying earth formations overlaying bodies of water. With a lower or remote end of the pipe emersed in water, the mixture of gases is usually ignited by ignition means connected to the pipe producing a wave front which proceeds in a downward direction through the pipe and strikes the surface of the water at a velocity substantially in excess of the velocity of sound to generate seismic impulses. However, since the pipe is emersed in water, heat generated within the pipe during operation is usually rather quickly dissipated. Further, the resulting mechanical vibration due to the impact of the detonation wave striking the water, is likewise dissipated since the boat at the surface of the water is itself cushioned against severe vibration.

Additionally, since both the shooting and recording can be performed aboard a single boat, coordination of these operations is greatly simplified. However, on land, these functions are usually carried out at separate geographical locations, requiring the use of complex synchronization circuitry at both the shooting and recording sites. Where digital recording of the resulting seismic reflection wave is contemplated, for example, as shown in U.S. Pat. No. 3,496,530 in which the seismic disturbance is generated by a series of hydraulically activated vibrators, synchronization becomes further complicated. Additionally, if the source of seismic energy is explosive gas charges to be ignited, repetitively, in a shothole below the earth's surface by means of digital control signals, both long- and short-lived emergencies can, from time to time arise at the shooting truck. Under such conditions coordination becomes, obviously, even more difficult.

SUMMARY OF THE INVENTION

In accordance with the present invention, a gas-chargeable digitally controlled repetitive seismic source is located within a shothole penetrating the weathered layer of the earth formation and operative by novel digital control circuitry within a shooting truck in accordance with a selected digital timing source code generated by a more remotely located repetitive timing logic circuitry as within a recording truck. The source code comprises: digital signals representative of multi-bit binary timing words (say nine- or 21-bit) as well as regularly occurring clock pulses.

Elements of the source controlled by the source code include:

1. an elongated pipe adapted for support within the shothole, the shothole being at least partially filled with liquid;
2. an elongated, enlarged firing chamber attached, at one end, to a remote end of said pipe within a shothole and open at the other end so as to contact the liquid within the shothole, the liquid within the firing chamber being used to form an impact surface for the chamber;
3. lateral offset means connected to the near uphole end of said pipe;
4. means connected to the lateral offset means for delivering to the firing chamber through said lateral offset and said pipe, a combustible gas mixture of predetermined amount;
5. ignitor means mounted in said lateral offset means;
6. means electrically connected to the ignitor means for energizing the ignitor means to initiate the combustion of the mixture whereupon a combustion wave travels through said pipe and said firing chamber and strikes, at impact, the interior surface of said liquid to generate a seismic disturbance;
7. length/diameter ratio of the pipe being within a range to support travel of said combustible wave at supersonic speed; and
8. a firing chamber having a tapered end section connected to the pipe to reestablish the combustion wave thereinafter emerging from the pipe.

Digital data responsive control circuitry at the shooting truck preferably connects in parallel with the delivery means and the energizing means whereby sequential control of one or the other is provided, as by means of (a) a first relay means electrically connected to a time decoding means for decoding the digital source code and operative thereby to control the delivery means so as to cause delivery along the elongated pipe and firing chamber of a predetermined amount of gas mixture, and (b) a second relay means electrically connected to the decoding means and operative to control and cause energization of the ignitor means to cause ignition of the gas mixture after delivery.

To allow the operator at the shooting truck to possess emergency control functions, the time decoding means at the shooting truck includes a separately operative switch network means which can be activated, independently, by the shooting truck operator should emergencies arise. Shooting operations can be restarted at the same or adjacent sequence when the operation was stopped without repeating previously performed steps, or can be begun anew. Each shooting cycle can also be automatically repeated (up to 999 times) without operator intervention.

Elements of time decoding means include:
a. control means comprising start/stop/restart signal generating means and switch network means controllably connected thereto capable of generating digital signals for initiating, stopping and restarting delivery of gas and energization thereof in accordance with the state of the switch network means;
b. timing counter means connected to control means (a) responsive to digital signals therefrom and including additional switch network means, for accumulating clock pulses from a source of said pulses to provide a plurality of digital signals in accordance with switch conditions of the additional switch network means,
c. control signal generating means including gate means selectively responsive to digital signals from control means (a) and timing counter means (b) as well as to digital signals indicative of a multi-bit digital data word passing through control means (a) for generating at least first and second group of control signals in which said first group sequentially controls the first and second relay means of the seismic source,
d. cyclic record counting means including yet additional switch network means as well as gate and counter means responsive to digital signals from control means (a) which indicate each shooting cycle and compare the indicated cycle to an encoded ending cycle value in accordance with conditions of the yet additional switch network means, the record counting means (d) also including a digital signal generating means responsive to digital signals from the gate and counter means thereof as well as to said second group of control signals generated by control signal generating means (c) to provide a cycle re-initiation digital signal, and
e. reset logic means including a series of gate means responsive to at least said cycle re-initiation digital signal from record counting means (d) to provide a series of set and reset digital signals for circuitry (a)-(d) for setting said (a)-(d) circuitry to a preselected initial condition which the seismic shooting cycle can be continually repeated without interruption until the ending cycle value encoded in record counting means (d) is attained.

Remotely located timing logic circuitry for generating the aforementioned time code may include gating means responsive to a time-break signal created by means of time-break indicating means attached to the firing chamber when a detonation wave passes through the firing chamber, whereby the gating means is held in an enabled state for predetermined duration to assure detection of all significant seismic reflection signals from the earth formation under survey, after generation of the seismic disturbance.

Other objects and advantages of the invention will become more evident from the following detailed description of a single embodiment when read in conjunction with the accompanying drawings in which:

BRIEF DESCRIPTION OF DRAWINGS

FIG. 2 is a side elevation illustrating in more detail, the fully operational seismic source system of FIG. 1 in which the firing chamber and delivery pipe are attached to a lateral offset pipe extending from the rear platform of the shooting truck;

FIGS. 3a, 3b, 4a and 4b illustrate details of the lateral offset pipe of FIG. 2;

Figure 5:
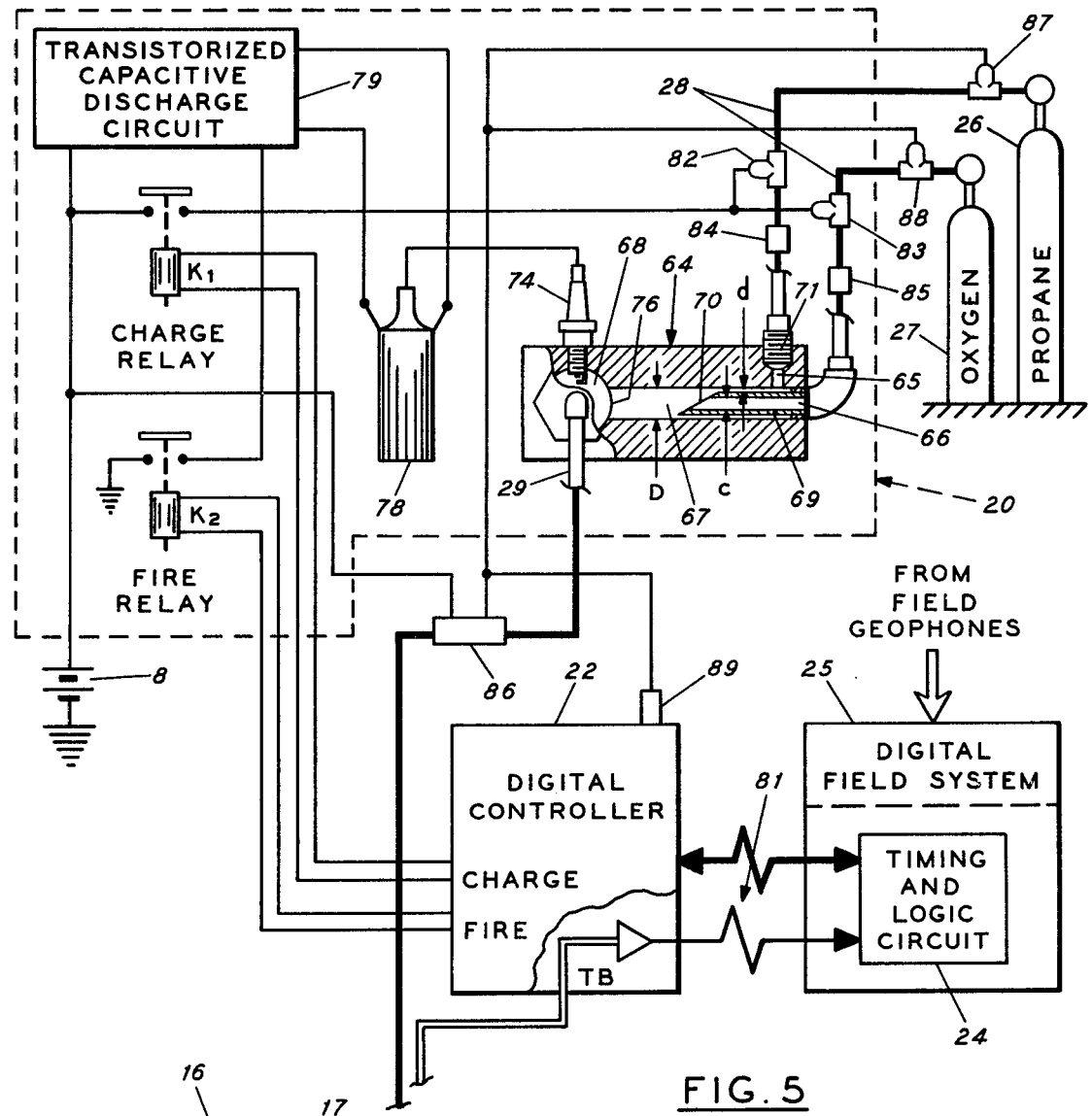
FIG. 5 is a block diagram of a digital data responsive control circuit housed within the shooting truck of FIG. 2 for controllable delivery and ignition of gas mixtures to the firing chamber within the shotholes of FIG. 1 using a preselected digital time code generated by timing logic circuitry remote from the shooting truck as within a separate recording truck.
Figure 8:
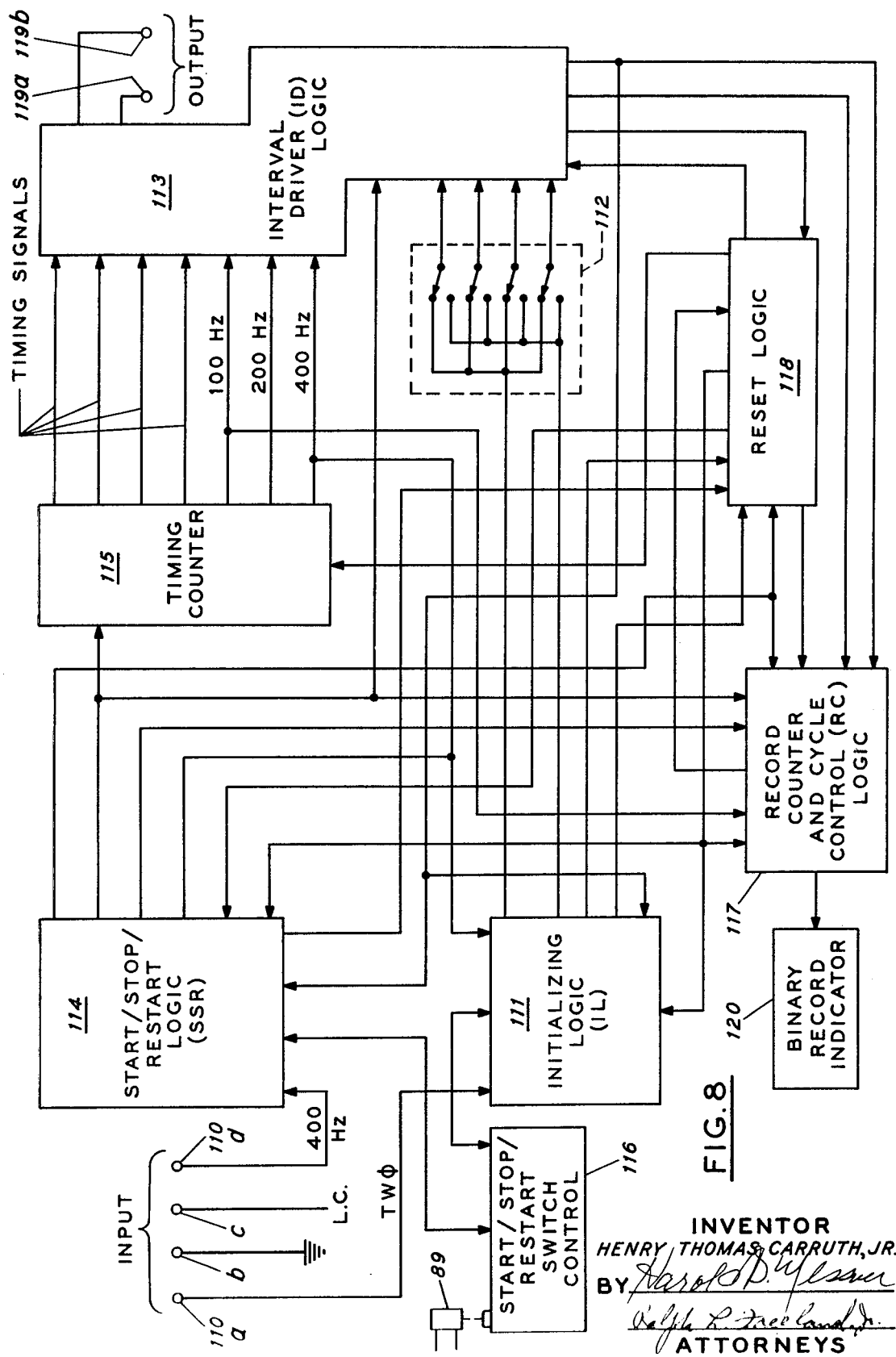

FIG. 6 is a block diagram of remotely located digital field system including timing logic circuitry for use in conjunction with the digital data control circuitry of FIG. 5;

FIG. 7 is a detailed diagram of a digital data control circuitry of FIG. 5;

FIG. 8 is a digital diagram of the time decoder of FIG. 7; and

FIGS. 9-14 depict specific details of the time decoder of FIG. 8.

DETAILED DESCRIPTION OF A PREFERRED EMBODIMENT

Figure 1:
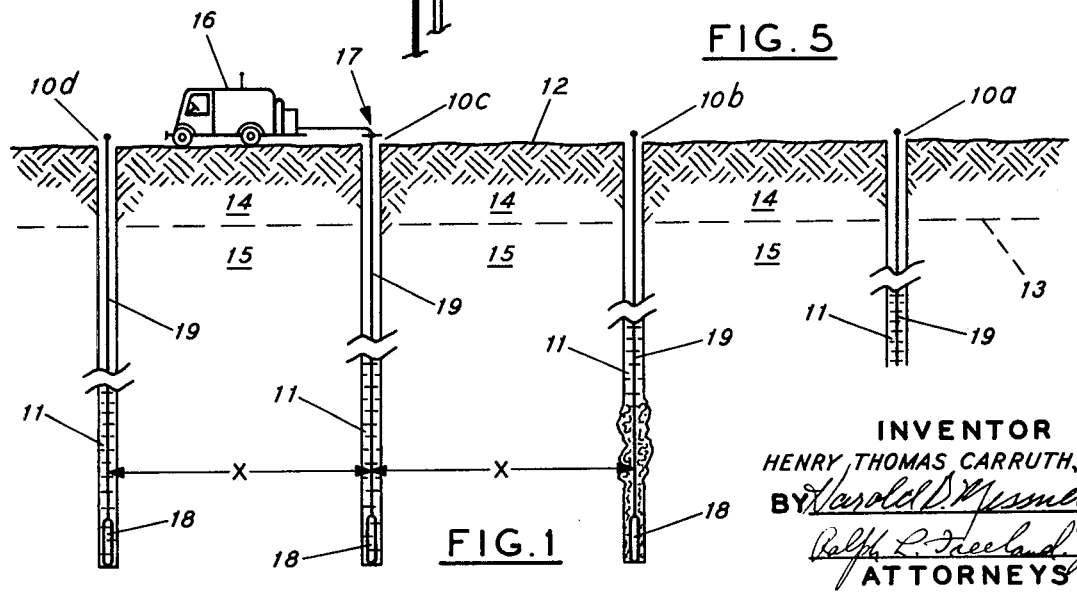
FIG. 1 is a side elevation of an earth formation illustrating a series of shotholes penetrating the weathered layer of the formation, several of the shotholes each depicting a firing chamber of a seismic source connected uphole to a straight delivery pipe terminating at the earth's surface, while a single shothole adjacent to a shooting truck is seen to accommodate a fully operational repetitive gas charge seismic source system in accordance with the present invention.

Reference is now made to FIG. 1. In FIG. 1 a series of shotholes 10a, 10b, 10c and 10d are depicted, each shothole over a region thereof being filled with a liquid 11 and extending below the earth's surface 12 to a substantial depth below the boundary or innerface 13 between weathered layer 14 and sub-weathered strata 15 of the earth formation under survey. In gathering seismic data in the field, so as to provide multiple surface coverage of the same area many times, repetitive gas seismic source system of the present invention generally indicated at 17 is energized, in sequence, within each shothole 10a-10d. In this regard, to obtain sufficient seismic data, each shothole may be used as a source point many times, the shooting crew associated with shooting truck 16 thereafter moving the seismic source system 17 from shothole to shothole as required.

In gathering data in the field so as to provide subsurface coverage of the same area many times, not only may a multiplicity of records be made utilizing a repetitive seismic source, but is also may be desirable to simultaneously advance both the position of the seismic source as change in the inline position of the geophone spread occurs. For example, the geophone spread could be advanced an inline distance equal to the distance X between shotholes. In that way, the resulting seismic information provides multiple coverage of the same surface area many times.

In such a technique, rapid movement of the source system 17 along the inline direction of survey obviously increases the efficiency of the collection process. Towards this objective, the series of shotholes 10a-10d can be drilled by one crew in advance of the shooting and recording parties. A second crew can then position a series of source sub-assemblies, say six or more roughly 360 ft. apart, each sub-assembly comprising a firing chamber 18 located at depth within a shothole connected to a vertically elongated delivery pipe 19 terminating adjacent to the earth's surface 12.

After the shooting and recording parties have collected seismic data utilizing the aforementioned source subassemblies, a third crew can retrieve the sub-assemblies and transfer them, say in sets of six each, to forward position of the survey. However, it is not uncommon that several source sub-assemblies may have to be abandoned. A portion of the shothole 10a-10b can cave in resulting in a wedging of a firing chamber 18 within the shothole as depicted for shothole 10b in FIG. 1.

FIG. 2 illustrates shooting truck 16 in more detail. As shown the truck 16 is provided with a mixing, delivery and ignition system indicated at 20 interior of housing 21 at its cantilevered rear platform 16a. Mounted adjacent to platform 16a are a pair of fuel cylinders 26 and 27. Each cylinder 26, 27 is separately connected to the mixing ignition and delivery system 20 as by way of fuel inlet conduits 28. Within housing 21, these conduits become merged into a single pipe, as explained hereinafter, the single pipe eventually exiting from housing 21 as exit pipe 29, thence coupling to offset pipe 30. Opposite to the end connected to housing 21, the offset pipe 30 is placed in engagement with the uphold end of pipe 19 through coupler 31. In turn, the opposite end of pipe 19 connects to firing chamber 18 through a second coupler 32.

In operation, the mixing, ignition and delivery system 20 is actuated by a novel digital data control circuit shown in phantom line interior of truck 16 at 22, for delivery of a controlled amount of gas from the cylinders 26 and 27 through lateral offset pipe 30 thence to vertical delivery pipe 19. Since generation of the seismic disturbance requires that a liquid surface is established interior of firing chamber 18, a series of coextensive slots 33 are provided at the terminal end of the firing chamber. Preferably, the series of slots 33 have longitudinal axes aligned with the axis of symmetry of the shothole. Liquid 11 within the shothole enters into the interior of the firing chamber 18 through the slots 33 establishing an initial liquid level at line 34. The gas mixture interior of vertical pipe 19 impinges on liquid 11 initially at level 34 and thereafter causes relocation say to a level indicated by phantom line 35 in the interior of firing chamber 18. Thereafter the gas flow is terminated. The resulting "L-shaped" column of combustible gas within the offset pipe 30, vertical pipe 19 and firing chamber 18 is then ignited to establish detonation wave. Within vertical pipe 19, the detonation wave reaches a velocity in excess of the speed of sound since the length to diameter ratio is controlled to be in the range of 10 to 80, with a range of 20 to 70 being preferred. As the detonation wave strikes the surface of the liquid at surface 35 interior of the firing chamber 18, a seismic disturbance is created. In this regard, the firing chamber 18 is seen also to have a tapered entryway 36 increasing from a diameter identical with that of vertical pipe 19 into an increased diameter so as to accommodate a large volume of mixed gas. Since the detonation wave after passing through vertical pipe 19 must be reestablished within the firing chamber 18, tapered entryway 36 provides a transitional closure to accommodate the flame front across the full cross-sectional area of the chamber 18.

Attention will now be directed to the constructural features of couplers 31 and 32 at the ends of vertical pipe 19. As shown in FIG. 3a, firing chamber 18 is threaded for mounting to collar 37. Collar 37 in turn is threadably mounted to pipe 19 but with an opposite helical orientation. Accordingly, it is evident that coupling the firing chamber 18 and pipe 19 using opposite helical thread orientations allows for the uncoupling of the vertical pipe 19 (and collar 37)— downhole—from the firing chamber 18 should an emergency arise. The retrieving crew can thus easily uncouple the firing chamber 18 from collar 37 as, for example, should firing chamber 18 become wedged within the shothole by simply rotating the pipe 19 at the earth's surface in proper direction to effect release.

As shown in FIG. 3b, at the opposite end of vertical delivery pipe 19 coupler 31 is seen to include a collar 39 interiorly threaded to engage the pipe 19 at one end and, at the other end, is provided a series of basses 41 for engagement with offset pipe 30. Engagement is provided by rotating collar 39, as by bar 42, until bosses 41 contact annulus 43 attached to the offset pipe 30. To prevent leakage of the gas mixture from the pipes in operation the collar 39 is also provided, over a central portion, with an O-ring 44.

Consideration will now be given to the coupling of offset pipe 30 relative to shooting truck 16. As indicated in FIGS. 4a and 4b, the offset pipe 30 is not formed of a straight section of pipe but is provided a laterally displaced swivel joint 45 adjacent to the truck. The swivel joint 45 includes, at its ends a pair of collars 46 and 47. Collar 46 connects to exit pipe 29 of the mixing, delivery and ignition system 20 of FIG. 2 while collar 46 connects to the main section of offset pipe 30 through a short stub 49 and valve 50.

Between the couplers 46 and 47 are elbows 52 and 53. Relative rotation of the elbows 52 and 53 about axis A—A is provided by ball bearings (not shown) internal of central housing 54. An O-ring (not shown) seals the elbows relative to the housing 54 during such rotation. In order to simplify design, swivel joint 45 is preferably of conventional design. (An example found to be adequate is a swivel joint manufactured by the Aeroquip Corporation, Barco Division, Barrington, Illinois, Series 5200). In operation, the swivel joint 45 allows for rotation of the offset main section of pipe 30 about axis A—A in response to reaction forces. After the seismic disturbance is created within the shothole, upwardly directed forces act on the pipe 30. However, these forces can be dissipated at the swivel joint 45 without undue mechanical damage to the system, through angular rotation of the offset pipe 30 in which axis of symmetry B—B thereof tilts relative to the earth's surface.

Valve 50 is merely for additional safety. It is hand operated by means of handle 55, as indicated in FIG. 4b, and provides for manual shutoff of the gaseous mixture as the recording truck is moved from shothole to shothole.

FIG. 5 illustrates mixing, delivery and ignition system 20 in more detail. As indicated in FIG. 5, the system 20 is externally connected as follows:
  i. by an entry piping network to fuel cylinders 26 and 27 by way of fuel inlet conduits 28,
  ii. by an exhaust piping network to firing chamber 18, in party, by way of exit pipe 29, and
  iii. electrically to timing logic circuit 24 of digital field system 25 by way of digital control circuitry, or controller 22.

At its interior, the system 20 includes an elongated T-mixing chamber 64 having separate entry ports 65, 66 connected to the fuel inlet conduits 28. (For convenience of description, the mixing chamber 64 in FIG. 5 is shown in partial section while the electrical circuitry is shown in more schematic form). T-mixing chamber 64 includes first and second horizontal bores 67 and 68; bore 67 connects at one end to the ports 65 and 66 and at the other end to horizontal bore 68. Since ignition of the gas mixture is initiated within the horizontal bore 68, bore 68 is referred to as the ignition bore; while horizontal bore 67 connected thereto is referred to as the mixing bore. Oxygen enters the bore 67 at port 66 through cylindrical nozzle 69 provided with a side wall of diameter C terminating in an oblique pathway 70. Oblique pathway 70 is formed by terminating the side wall along a bias relative to the axis of symmetry of the bore 67. Propane enters the bore at port 65 by way of threaded coupler 71. Since the diameter D of the bore 67 is just slightly greater than the outside diameter of the nozzle 69, say by the amount that is twice the spiral interval $d$ the propane entering the bore 69 at port 65 is obviously to be mixed with oxygen in non-equal proportions, say five parts oxygen to one part propane. Since the initial direction of the propane is at right angles to axis of the nozzle 69, impingement at its outer periphery causes, initially, diffusion, and later, spiral motion. Likewise, the oblique orientation of the pathway 70 at the opposite and of the nozzle 69 provides similar spiralling motion about the axis of the bore 67 for the oxygen. Mixing of the fuels is thus assured.

Horizontal bore 68 is seen to be larger in diameter than bore 67 and is provided at one end with sparkplug 74 and, at the other end, terminates in exit pipe 29.

Such construction does not mean, however, that during ignition of the gas mixture within the bore 68 that gas within bore 67 may not ignite; e.g., the flame front may enter bore 67 at junction 76 and propagate towards the nozzle 69. However, because of the fact that the horizontal bore 67 is perpendicular to the ignition bore 68, such condition is minimized, providing a "first state flame arrest." Additionally, the relatively small spacing $d$ between the outer periphery of the nozzle 69 and the side wall of the bore 67 provides for second stage arrest in the vicinity of the nozzle 69.

Consideration should now be given to the means for igniting the gas mixture within ignitor bore 68. As shown, sparkplug 74 is electrically connected by way of ignition coil 78 and a transistorized capacitive discharge circuit 79 to a source battery 80. Control of the transistorized discharge circuit 79 is by way of firing relay $K_2$ interconnected between the discharge circuit 79 and the battery 80, the relay $K_2$ being controlled by digital data controller 22 electrically connected to digital field system 25. As previously mentioned, digital data controller 22 is conveniently located within the shooting truck and is in electrical communication with timing, logic circuit 24 of the digital field system 25, the latter being usually located at a remote position therefrom, as in a recording truck through a series of conductors generally indicated at 81. The digital controller 22 not only controls fire relay $K_2$, but also controls, on alternate time sequences, a charging relay $K_1$ for entry of gas into the mixing chamber 64. As indicated, the relay $K_1$ connects to valves 82 and 83. On command, the relay $K_1$ is actuated to open the valves 82 and 83. On command, the relay $K_1$ is actuated to open the valves 82, 82 to gas flow under pressure. In this regard, pressure regulators are preferably included in the conduits 28, say at 84, 85, to maintain the oxygen and propane at selected pressure levels, say 50 psi for the oxygen and 20 psi for the propane. After a predetermined time interval as determined by the controller 22, the relay $K_1$ is deenergized. Thereafter, the firing relay $K_2$ is activated, causing sparkplug 74 to fire through the transistorized discharge unit 79 and source 80. In this regard, since the source 80 is preferably a 12-volt standard battery, the discharge unit 79 can be readily purchased commercially, as a unit. After ignition of the gas mixture within the system 20, the firing relay $K_2$ is deenergized and a new cycle is initiated in accordance with a preselected repetitive rate.

Repetitive rate of the system obviously is dependent upon several operational factors such as shooting depth, fuel pressure, heat conduction characteristics, etc. Once the rate has been established—programmed—at the digital field system 25, operations can occur continuously.

However, should the rate be initially established at too high a level excessively high temperatures could occur adjacent within system 20, say at temperature condition thermalswitch 86 attached to exit pipe 29 of FIG. 5. As a new cycle occurs, gas entering the overheated section of pipe 29 can undergo combustion even though the sparkplug 74 is in a disabled state. Under such conditions, thermalswitch 86 actuates switch contacts therein so as to independently interrupt the firing/charging cycles of the system, as by connecting fail-safe valves 87 and 88 directly to source battery 80 to cause closure. Although such interruption can be independent of both the digital controller 22 as well as the digital field system 25, it is preferred that thermalswitch 86 also cause energization of relay 89 for interrupting operation of digital controller 22. However, operation of the digital field system 25 need not be interrupted.

FIG. 6 illustrates digital field system 25 in more detail. Prior to the discussion, in detail, of the operation of digital field system 25, it should be evident from the prior description of FIG. 5 that digital system 25 provides two main control functions:

i. delivery and ignition of gas mixtures in sequence to cause a series of disturbances in accordance with a preselected timing code; and
ii. digitization and recording in binary format received reflection seismic signals.

With reference to item (ii), above, an enabling signal indicative of zero time for recordation of seismic signals is required. For this purpose, the present invention provides time-break switch 90 at firing chamber 18 of FIG. 2. As each detonation wave passes through the chamber 18, time-break switch 90 closed to initiate an enabling signal to the digital field system 25 of FIG. 6. In more detail, digital field system 25 of FIG. 6 is seen to include timing logic circuit 24 previously mentioned including a timing logic circuit 91 under partial control of gate switch means 92. At the closure of time-break switch 90 a one shot multi-vibrator within gate means 92 is initiated for a predetermined time period, say 4 to 6 seconds. During the time interval, reflection seismic signals can be received and passed by way of data input conductors and amplifiers 93 for eventual digital recordation at magnetic tape unit 98. In more detail, the reflected signals pass from amplifiers 93 to multiplexer 94, thence to analog-to-digital converter 95, master copy logic circuit 96, formal control circuit 97 and finally onto magnetic tape unit 98. As the data is received at amplifiers 93, binary gain shifts are indicated by binary gain feedback control circuit 99 and the master copy logic circuit 96. To provide data processing controls compatible with computer processing techniques, logic circuits 99 and 100 sequentially operate utilizing timing and word counters 101 and 102. As is conventional, the timing and logic circuit 23 produces a series of timing (clock) pulses to establish a time code applied to the logic circuits 96 and 100 through word counter 101 and the block counter 102. Accordingly, received seismic signals can be correctly identified, digitized and then recorded onto the magnetic tape at magnetic tape 98 in proper sequence.

Recordation of the seismic signals received on amplifiers 93 first requires the determination of the amplitude of the data as the data is sampled. After a particular value of binary gain is established for the sample data, the gain is then gated through the binary control logic circuit 100 in proper sequence to the master copy logic circuit 96 for digital recording on the same channel as the binary seismic data. At multiplexer 94, the amplitude of each analog's signal is electrically sampled, in sequence, over a plurality of very small time intervals, say, 0.002-second intervals. These signals are then transferred to digital converter 95 where the digital result of the multiplexing operation is represented by a series of multibyte binary code indications. The binary code information is electrically suited for storage on magnetic tape at the magnetic tape unit 98 on the same channel as its associated binary gain information.

During all these steps, all activity is paced by regularly occurring clock signals, as through master clock 103. Each operation of master copy logic circuit 96 requires a certain number of clock pulses. Consequently, timing to complete any one of the various operations is an exact multiple of the clock pulses as determined in part, by word and block counters 101 and 102. However, operation of counters 101 and 102 are not limited to digital recording of seismic data. The timing logic circuit 24 through block counters 101 and 102 can provide enabling signals for the digital controller 22.

FIG. 7 illustrates, in detail, digital controller 22. As indicated, controller 22 includes time decoder 105 comprising a series of gates and flip-flop circuits, as explained below, for time dependent, controlled energization of relays $K_1$ and $K_2$ as through transistors 106 and 107. Each transistor 106, 107 is independently operative. For example, the presence of sets of enabling signals at the time decoder 105 can enable, independently, one or the other transistors 106, 107 to allow current to pass from power supply 108 by way of the relays $K_1$ or $K_2$ thence through the transistor 106 or 107. As indicated, power supply 108 is connected to 12-volt battery source 109. Interconnected between the power supply 108 and the relays $K_1$, $K_2$ is a diode dampening circuit 110. Dampening circuit 110 dampens the induction spikes of the relays $K_1$ or $K_2$ during operations. Not only do the transistors 106, 107 thus provide high current drive for operation of the relays $K_1$–$K_2$ but they also prevent intrusion of inductive spikes through the time decoder 105 directly into the digital field system 25 of FIG. 6.

DETAILED DESCRIPTION OF TIME DECODER 105 (FIG. 8)

Reference is now made to FIG. 8 in which time decoder 105 is shown in detail. Within the recording truck, the time break signal (TB) serves to initialize its operations to produce a time source code, used, in turn, to synchronize operations of the shooting truck. Although the number of recording cycles, or records, may be repeated automatically at an arbitrary value, say up to 999, the operation of time decoder 105 remains a function of the time source code generated by the digital field system (DFS) 25 of FIG. 5.

As shown in FIG. 8, input terminals 110a-110d of the decoder 105 pass DFS signals $S_1-S_4$ as follows:

i. terminal 110a passes the work and block pulses comprising a part of the source code through initialization logic circuitry 111 (hereinafter referred to as IL logic circuit 111) to interval driver logic circuit 113 (hereinafter referred to as ID logic circuit 113);

ii. terminal 110c connects to the logic common (L.C.) of the DFS; and iii. terminal 110d passes clock pulses at a certain rate, e.g., 400 Hz., through start/stop/restart logic circuitry 114 (hereinafter referred to as SSR logic circuit 114), to the following: to IL logic circuit 111, to timing circuitry 115 and to ID logic circuitry 113.

Even though the source code is present at terminals 110a-110d does not, however, necessarily mean that a shooting cycle will be initiated. Independent control of such operations is also provided within the shooting truck by means of start/stop/restart switch control 116 (hereinafter called SSR switch control 116) connected to SSR logic circuit 114 and to IL circuit 111 as shown. Should the operator with to stop, for example, the shooting operations at a selected point and, thereafter, continue such operations, i.e., stop then restart, he can activate switches of SSR switch control 116 (usually called stop and restart switches) to effect such control operations in the SSR logic circuit 114 without losing either record counting control, as at record count and cycle control logic circuit 117 (called RC logic circuit 117 hereinafter) or sequence control at reset logic network 118. Similarly, if retention of the prior performed shooting functions is not needed, the operator can close other switching elements within the SSR switch control 116 (usually called a reset switch) to control operation of initialization logic circuit 111 to begin the operations anew, at time zero.

Output terminals 119a and 119b of ID logic current 113 are used to pass control signals generated within time decoder 105 to relays $K_1$ and $K_2$ of FIG. 5. The duration of these control signals is not fixed by the source code, however, but can be independently changed by the shooting truck operator by activation of switch networks within timing counter 115 and record counter 117, as explained below. Since a selected number of shooting cycles, up to 32, are to be collected, automatically, before the entire operation is interrupted, the RC logic circuit 117 is provided with controls to automatically initiate new shooting cycles; when a preselected number of records have been collected, it then terminates operations. Binary record indicator 120 allows the operator to visually observe the record counting operation.

Individual elements of the time decoder 105 depicted in FIG. 8 have been constructed and tested successfully, and will now be described, in detail, with reference to FIGS. 9, 10, 11, 12, 13 and 14. In the description that follows the initials FF stand for flip-flop circuits.

INITIALIZATION LOGIC CIRCUIT 111 (FIGS. 9a and 9b)

As shown, input terminals 121a and 121b connect by conductors to bistable FF 123, 124 to pass word pulses and clock pulses respectively through these FF 123 and 124 to an output network indicated at 127a-127d at selected time sequences. In more detail, a word pulse passes through terminal 121a to bistable FF 123 which provides a reset signal at output gate 126 and terminal 127a. Terminal 127a, in turn, as detailed below, connects to reset logic circuit 118 of FIG. 8. After the reset signal has passed to the reset logic circuit 118, as explained below, not only is that circuit reset to zero, but it also provides, as explained below, a reset pulse for bistable FF 123 and 124 passing thereto by way of input terminal 121c. Input terminal 121b is seen to be connected to FF 123. Clock pulses pass through the input terminal 121b to FF 123 which then triggers, by way of conductor 123a, FF 124. The FF 124 provides in conjunction with gates 129 and 130 word pulses (one and zero) at output terminals 127c and 127d which pass therefrom to switch network 112, FIG. 8. Gate 128 is likewise enabled by FF 124 for enabling an appropriate visual indicator at SSR switch control 116. At the end of each cycle, a restart pulse from ID logic circuit 113, as explained below, reinstates operations by passing the restart pulse through input terminal 121d to FF 123 for enabling gate 122.

Should the operator desire to abort operations, the stop switch in the SSR switch control 116 connected to the IL circuit 111 by way of terminal 127e, is opened disabling the gates 126, 129 and 130. To restart operations at the beginning of the cycle (time-zero) the restart switch within the SSR switch control 116 can be closed by the operator as at input terminals 125a and 125b activating through gate 132, FF 132 and output terminal 133, the reset logic circuit 118, as explained below.

START/STOP/RESTART LOGIC CIRCUIT 114 (FIG. 10)

Assuming that the operator at the shooting truck has pre-programmed the shooting operations as to number and duration of the sequence steps (as determined by switch conditions at timing counter 115) as well as to the repetition rate or number of records to be made without interruption (as determined by switch conditions at record counter 117), the SSR logic circuit 114 is initialized; reset pulses pass through input terminals 135b and 135f to FF 138, 139, and 151, 152 respectively from reset logic circuit 118. In general, the functional operations of SSR logic circuit 114 include the provision of initiation of signals at output terminals 144a-144g, based on commands initiated at either the recording or shooting truck, or at both. Now in more detail, assume that clock pulses have enabled gates 147-149. At input terminal 135a, also assume that closure of the start switch within SSR switch control 116 has occurred, which triggers FF 138 and 139 to provide pulses at output terminals 144a–144c. Signals at output terminals 144a–144c function as follows:

| Item | Activated Through | Functions of Pulse |
|---|---|---|
| (1) Output Terminal 145a | Gates 140, 141 | Enables ID logic circuit 113 viz. input terminal 171e (FIG. 12a) |
| (2) Output Terminal 145b | Gates 140, 142 | (i) Enables ID logic circuit 113 viz. at input terminal 180e (FIG. 12b) (ii) Enables RC logic circuit 117 viz. at input terminal 205c (FIG. 14) (iii) Enables timing counter 115 viz. input terminal 160a (FIG. 11) |
| (3) Output Terminal 145c | Gates 140, 142, 143 | Enables an indicator (visual) at SSR switch control 116 |

In order to allow the operator to manually interrupt operations, but then restart operation, without losing either record or sequence count, the input terminal 135d of SSR logic circuit 114 is connected to the stop switch at SSR switch control 116, as shown in FIG. 8. It is recognized that such stop operation could be automatically generated using relay 89 (FIG. 7) to close the stop switch at SSR switch control 116. Input terminal 135e connects to the restart switch of SSR switch control 116.

Figure 12A:
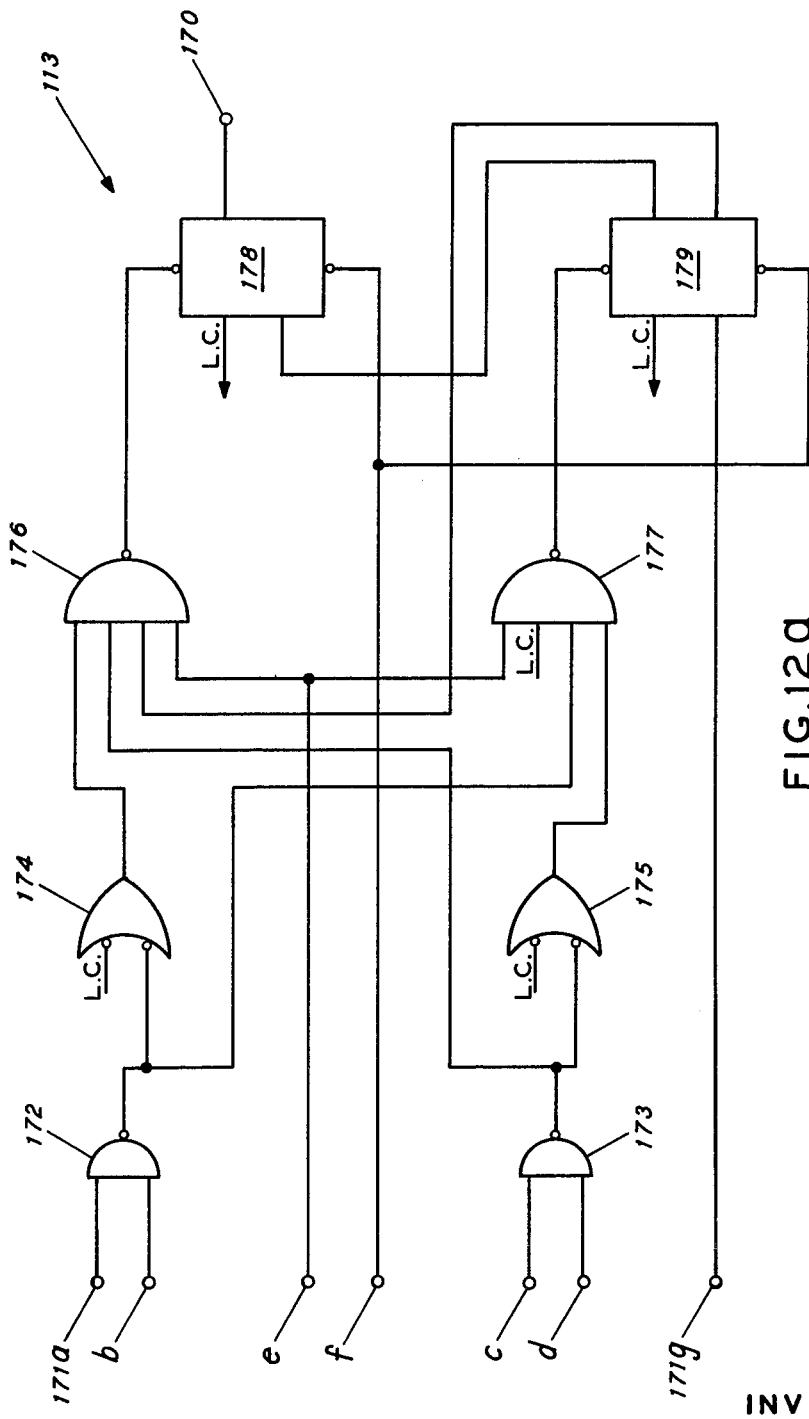
Figure 12B:
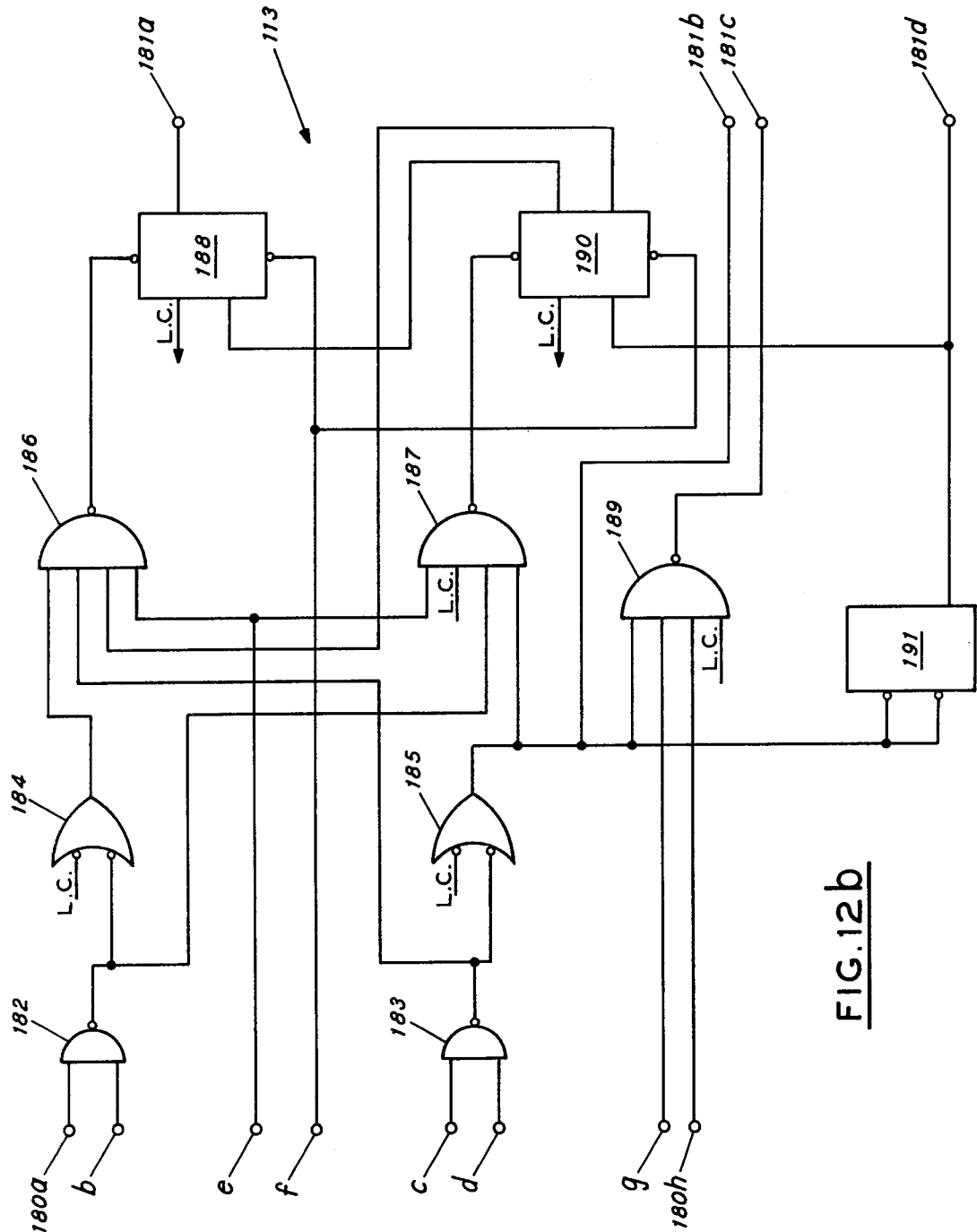

| Item | Activates Through | Function of Signal |
|---|---|---|
| (1) Output-Terminal 135d (STOP) | FF151, Gate 150 FF 152, Gates 153, 155 | Disables Gate 140 so as to disable enabling pulses at output terminals 144a–144c; also produces ZERO signal at output terminal 144g for resetting of reset logic circuit 118 which in turn resets ID logic circuit 113 viz. at input terminals 171f and 180f (FIGS. 12a & 12b). Also enables gate 155 at output terminal 144f to light a stop bulb at SSR switch control 116. |
| (2) Input Terminal 135e (RESTART) | Gate 146, FF 151, 152 Gate 153, Gate 150, Gate 155, Gate 140 | Enables gate 140; produces a ONE signal, at output terminal 144g disabling gate 155; at output terminal 144e produces a ZERO signal for incrementing the RC logic counter 117 to a new value at input terminal 205d thereof (FIG. 14). |

At output terminal 144h, clock pulses pass to timing counter 115, ID logic circuit 113 and IL circuit 111.

At the end of each sequence, the operation can be automatically repeated as explained below with reference to RC logic circuit 117 (FIG. 14) activating reset logic circuit 118 (FIG. 13) to generate signals at input terminals 135b and 135f for resetting FF 138, 139 and 151, 152 of SSR logic circuit 114. Prior to resetting of the FFs, a signal for FF 152 at input terminal 135c is generated from ID logic circuit 113 (FIG. 12b), viz. from output terminal 181b thereof (FIG. 12b) to set FF 152.

TIMING CIRCUIT 115 (FIG. 11)

Figure 11:
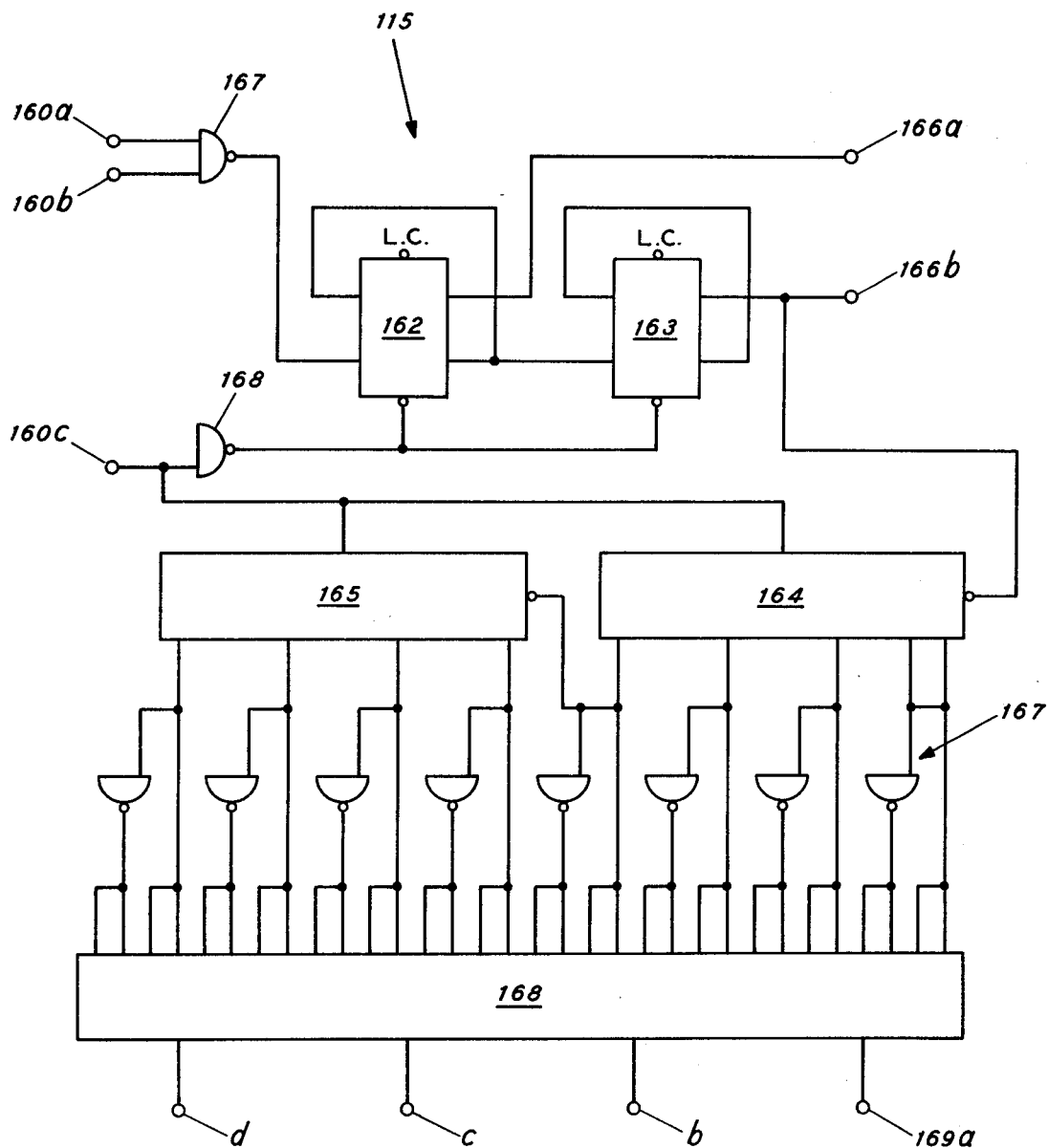

Timing circuit 115 is depicted in detail in FIG. 11.

As shown, after the circuit 115 has been initialized, clock and start signals (ONES) appear by way of input terminals 160a and 160b to trigger FF 162, 163 through gate 167. The start signal passes through input terminal 160a from SSR logic circuit 114, viz. from output terminal 144b (FIG. 10), while the clock pulses (400 Hz.) from the same SSR logic circuit 114 appear at input terminal 160b. The output of FF 162 is a multiple of the clock pulses, say 200 Hz., this output appearing at output terminal 166a for transference to ID logic circuit 113. Similarly, the clock pulse output of FF 163, say 100 Hz. appears:

1. at terminal 166b for transference to two separate circuits
   i. to the ID logic circuit 113, as explained above, and
   ii. to record counter (RC) logic circuit 117 and
2. at counters 164, 165.

However, item (ii) relates only to the fact that initialization of all circuitry must occur before the operating cycle, viz. item (i) can occur.

In this regard, the initialization occurs by the triggering of a one-shot multi vibrator in record counter (RC) logic circuit 117, which, in turn, causes reset logic circuit 118 to be activated to produce selected reset functions to start the process.

Counters 164, 165 are conventional, accumulating clock pulses. After a selected number of pulses are accumulated, under control of switch network 168 and gate network 167, a series of control signals are produced at output terminals 169c and 169d. These control signals functionally control the ID logic circuitry 113. Resetting of the counters 164, 165, as well as FF 162, 163 at the end of each cycle is by means of a signal (ONE) passing through input terminal 160c and gate 168. The reset pulse is generated by reset logic circuit 118.

INTERVAL DRIVER LOGIC CIRCUIT 113 (FIGS. 12a & 12b)

Interval driver logic circuit 113 (FIGS. 12a and 12b) is shown in detail in FIGS. 12a and 12b.

Figure 10:
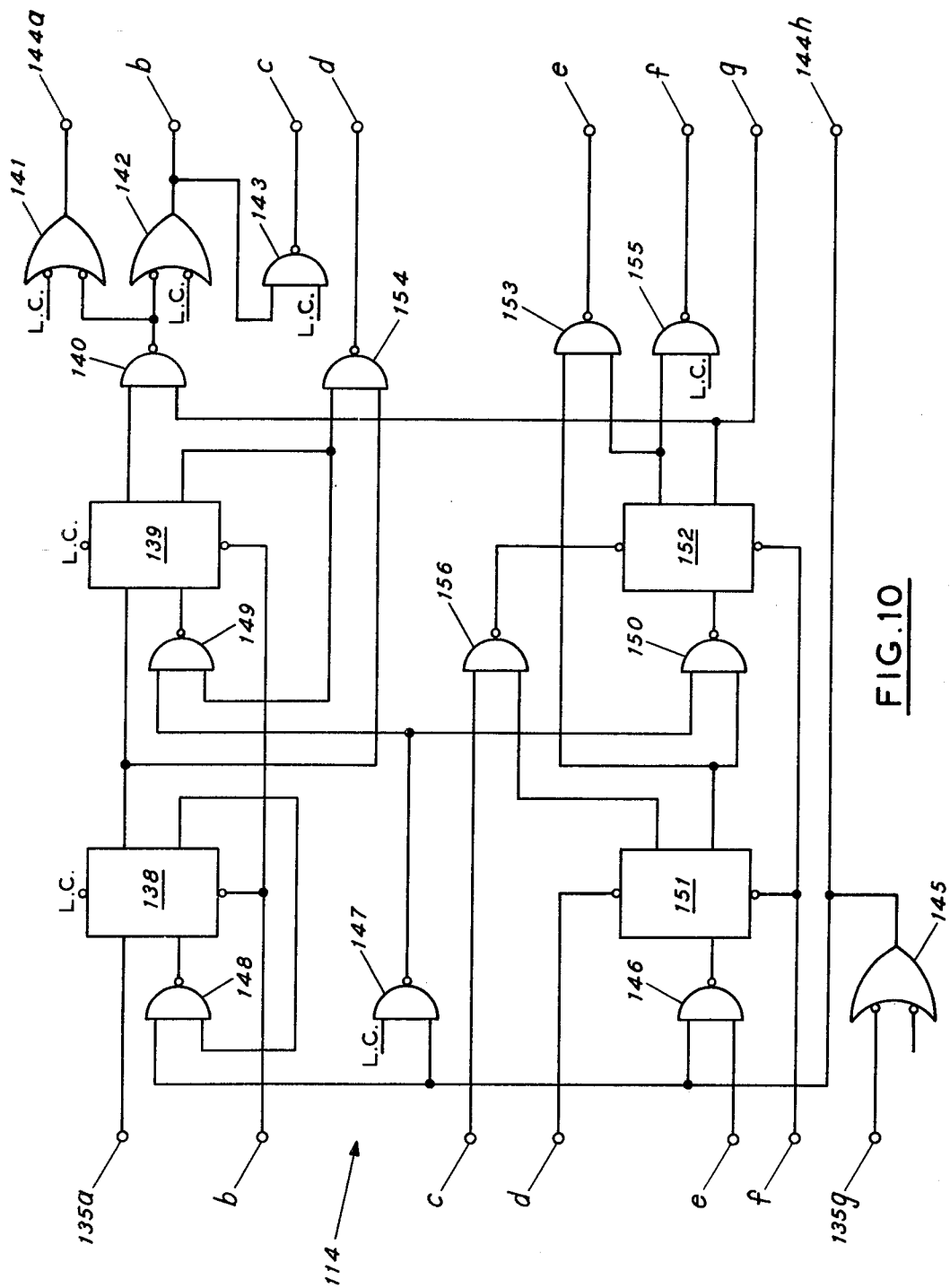

In FIG. 12a, the circuit is seen to provide a timing control signal at output terminal 170 for activation of relay $K_1^-$ of FIG. 7 for a predetermined interval (called the $\Delta T_1$ timing interval) so as to control the amount of explosive gas downhole in the gun. In order to activate the gates 172, 173 in correct timed sequence, terminal pairs 171a, 171b and 171c and 171d, each must pass identical coded pulses. For this purpose, terminals 171a and 171c connect to terminals 169a and 169b of timing counter 115 (FIG. 10). As timing sequences are generated, they pass through gates 172–177 to FFS 179 and FF 178. Simultaneously, terminals 171b and 171d provide passage of timing word pulses from IL logic 111 through switch network 112 (FIG. 8).

A start pulse (or alternately, a stop pulse) from SSR logic circuit 114 passes by way of input terminal 171e to gates 176, 177 while a restart pulse (initiated when the operator, for example, utilizes SSR switch control 116 of FIG. 8) appears at terminal 171f. That reset pulse is generated at reset logic 118 and resets FF 178.

At terminal 171e a reset pulse from reset logic 118 appears to reset FF 178 at the end of the last interval step, i.e., after the $K_7$ relay of FIG. 7 has been activated to fire the gas gun and gun has cooled sufficiently to allow a new shooting cycle to begin (called a $\Delta T_2$ time interval).

In FIG. 12b, input terminals 180a–180f pass pulses in identical manner, as described above. For example, input terminals 180a and 180c are used to pass enabling signals through to output terminal 181a for firing of relay $K_2$ and allowing for subsequently cooling off of the gun. In order to activate the gates 182, 183 in correct timed sequence, terminals pairs 180a and 180b and 180c and 180d must pass coded interval timing pulses defining the $\Delta T_2$ timing interval. For this purpose, terminal 180a and 180c are connected to terminals 169c and 169d of timing counter 115 of FIG. 11d, so as to pass properly timed signals to gates 182–187 and FF 188, 190. Terminals 180b and 180d provide passage of timing word and block pulses passing through switch network 112 from IL logic circuit 111 (FIG. 8) for controlling these gates and FFs 188 and 190 in a selected timed relationship. A start pulse (or absence thereof) from SSR logic circuit 114 of FIG. 8 passes by way of terminal 180e to gates 186, 187, while a restart pulse resets the FF 188 and 190 when the operator interrupts the $\Delta T_2$ interval by means of the stop switch at SSR switch control 116 of FIG. 8.

At input terminals 180g and 180h, clock pulses from timing circuit 115 (FIG. 10) (i.e., from terminal 166a and 166b hereof) are seen to be passed to gate 189. After gates 183, 185 have been enabled (signaling that the $\Delta T_2$ timing interval has been completed), the gate 189 is enabled, signals passing through that gate to output terminal 181c so as to increment record counter (RC) logic circuit 117. The enabling of gate 185 simultaneously does the following:

i. passes, by way of terminal 181b, signals to reset stop FF 152 at input terminal 135c of SSR logic circuit 114 (FIG. 10); to reset FF 124 at input terminal 121d of the IL logic circuit 111 (FIG. 9a); and to reset record counter (RC) logic 117, for producing a reinitiation signal to automatically initiate a new shooting cycle;

ii. passes, to FF 191 (a one shot multivibrator) enabling signals for producing cycle reinitiation signals in cooperation with the recycle signal produced at RC logic circuit 117, including providing controlling signals to FF 190, as shown, as well as to FF 179 at input terminal 171g of FIG. 12A.

RESET LOGIC CIRCUIT 118 (FIG. 13)

Figure 13:
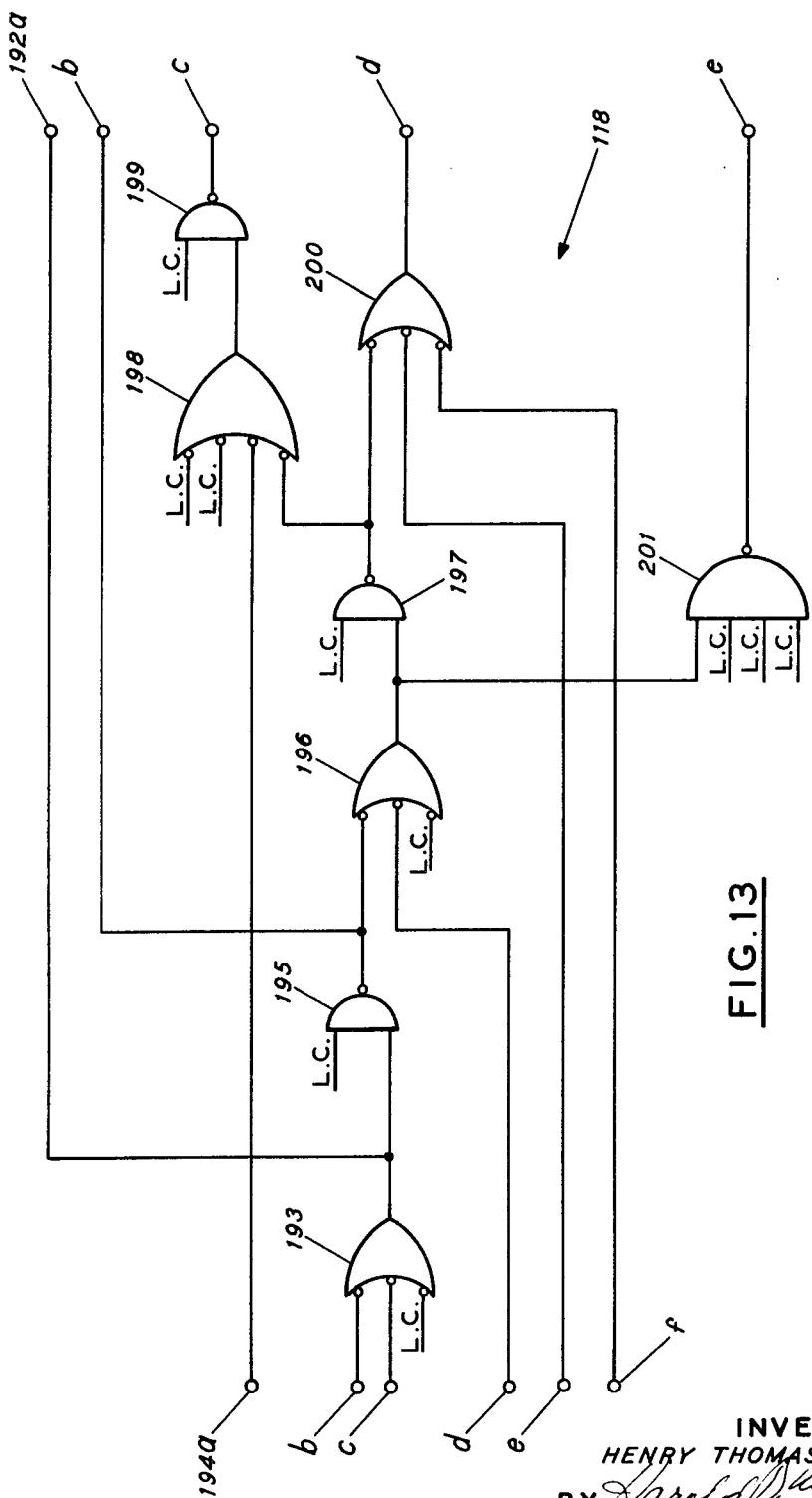

Reset logic circuit 118 is shown at FIG. 13 and, in operation, provides a multiplicity of reset signals at output terminals 192a–192f in response to the following conditions at input terminals 194c–194f:

| Item | Activates Through | Function of Pulse | In Response To |
|---|---|---|---|
| 1. Input Terminal 194a | Gates 198, 199 | Resets by ZERO signal ID logic circuit 113, viz. FF 178, 179 (FIG. 12a); FF 188, 190 (FIG. 12b) | Signals (ZERO) from FF 152 (FIG. 10). |
| 2. Input Terminals 194b, 194c | 193, 195–201 | Resets the following: (i) at output terminal 192a: resets record counter of RC logic circuit 117; (ii) at terminal 192b resets SSR logic circuit 114, viz. FFs 138, 139 (FIG. 10); (iii) at terminal 192c, resets ID logic circuit 113, viz. FFs 118, 179 (FIG. 12a) FFS 188, 190 (FIG. 12a); (iv) at terminal 192d resets timing counter 115, viz FF 162 and 163 and counters 164 and 165 (FIG. 11); (v) at terminal 192e resets FFS 123, 124 (FIG. 9a); resets the automatic stop FF of the record counter 117; as well as resets FF 151, 152 (FIG. 10). | (i) Signals (ZERO) from RC logic circuit 117 to indicate end of sequence but not cycle, or from IL logic circuit 111, viz from FF 132 (FIG. 9b). (ii) Same as (i) above. (iii)-(v): Same as (i), above. |
| 3. Input Terminal 194d | Gates 196–201 | At terminal 192c, see (iii) above; at terminal 192d, see (iv) supra; at terminal 192e, see (v) supra. | Signal (ZERO) from SSR logic circuit viz through gate 154 and terminal 144d (FIG. 10). |
| 4. Input terminal 194e | Gate 200 | at terminal 192d, see (iv) supra. | Signal (ZERO) from GG 123 and NAND gate 126 (FIG. 9a) of IL logic circuit 111. |
| 5. Input terminal 194f | Gate 200 | at terminal 192d, see (iv) supra. | Signal (ZERO) from FF 191 through terminal 181d of ID logic circuit 113 (FIG. 12b). |

RECORD COUNTER AND CYCLE CONTROL LOGIC CIRCUIT 117 (FIG. 14)

Figure 14:
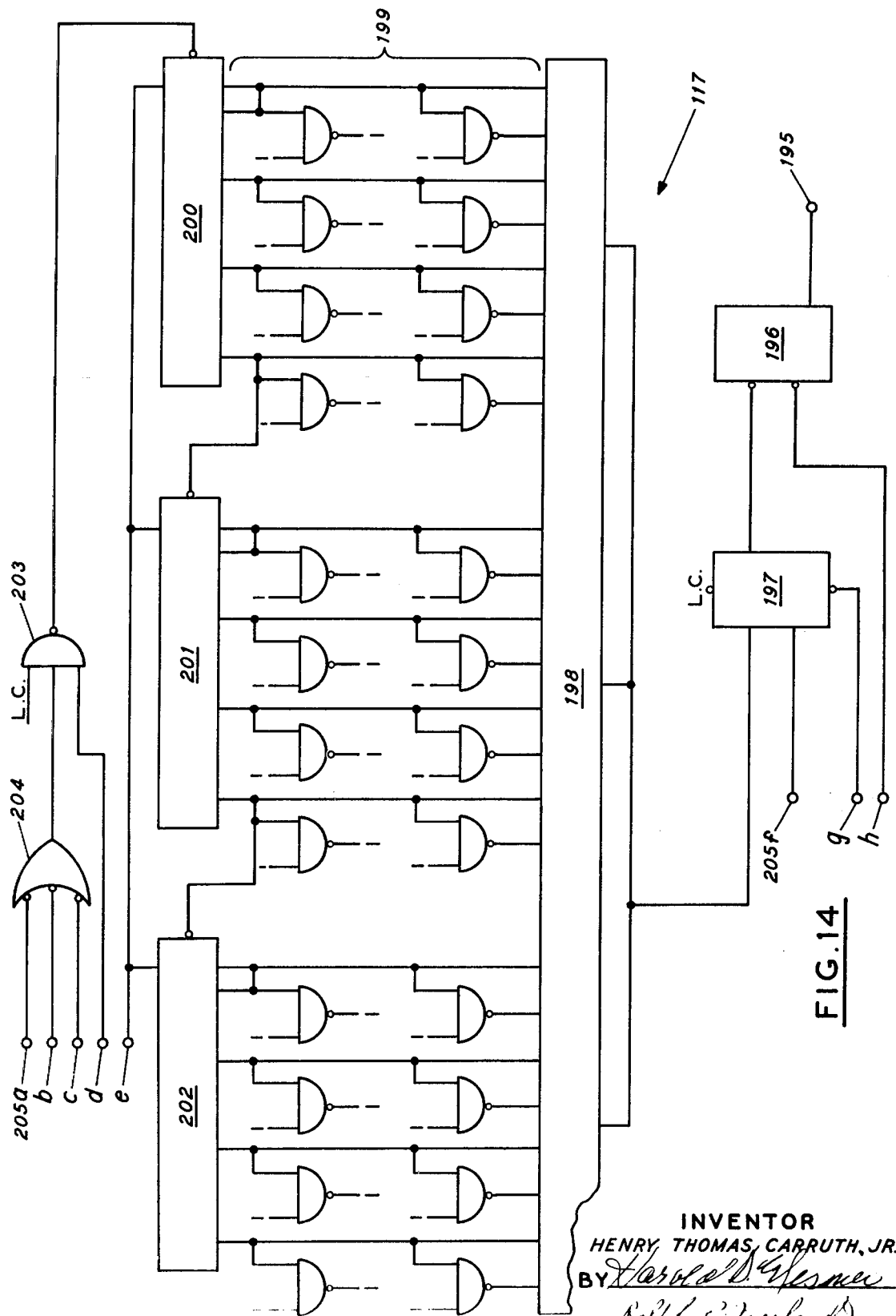

Record counter and cycle control logic circuit 117 is shown at FIG. 14 and, in operation, provides means for counting the number of shooting cycles, and, after a positive comparison is made with a normalizing set point value, produces a reset signal at terminal 195 for resetting reset logic circuit 118 via input terminal 194c and gates 193, 195–201 (FIG. 13).

The nature of operation of the reset logic circuit 118 in response to the aforementioned reset signal has been previously described with reference to FIG. 13. When the record count reaches the normalizing set point value, termination of the entire field collection process is produced by disabling FF 196 and 197 through switch network 198, NAND gates network 199, counters 200–202 and gates 203, 204. Input terminals 205a–205e connect to gates 203, 204, and input terminals 205f–205h connected to FF 196, 197 to provide the following operations:

| Item | Activated Through | Function of Signal | In Response To |
|---|---|---|---|
| 1. Input terminals 205a 205b | Gates 203, 204 | Increments counters 200–202 | ZERO signals produced by SSR logic circuit 114, viz. at output terminals 114d and 114e (FIG. 10). |

| | | | | |
|---|---|---|---|---|
| 2. Input terminal 205d | Gate 203 | Enables counters 200-202 | ONE signal produced by SSR logic circuit 114 viz. from output terminal 144a (FIG. 10). | |
| 3. Input terminal 205c | Gates 203-204 | Increments Counters 200-202 at the end of each cycle. | ZERO signal from ID logic circuit 113 VIZ. from output terminal 181c (FIG. 12b) | 5 |
| 4. Input terminal 205e | Counters 200-202 | Resets counters 200-202 | ONE signal from reset logic circuit 118 viz. from output terminal 192a (FIG. 13). | 10 |
| 5. Input terminal 205f | FF 197 | Aids in triggering auto. stop FF 197 | Clock pulses from timing counter 115 viz from FF 163 and output terminal 166b (FIG. 11). | 15 |
| 6. Input terminal 205g | FF 197 | Resets auto stop FF 197 | ZERO signal from reset logic circuit 118 viz. from output terminal 192e (FIG. 13). | 20 |
| 7. Input terminal 205h | FF 196 | Triggers auto stop FF 196 | ONE signal from ID logic circuit 113, viz. from terminal 181b (FIG. 12b). | 25 |

While certain preferred embodiments of the invention have been specifically disclosed, it should be understood that the invention is not limited thereto as many variations will be readily apparent to those skilled in the art. For example, since the shooting truck utilizes a 12-volt system, it is preferred that battery sources 80 and 109 depicted in FIGS. 5 and 7, respectively, be compatible.

What is claimed is:

1. A repetitive seismic source system comprising:
   a. an elongated pipe adapted for support within a borehole penetrating an earth formation at least partially filled with liquid:
   b. an elongated enlarged firing chamber attached, at one end, to a remote end of said pipe within said borehole and open at the other end so as to contact said liquid in said borehole and to form an impact surface for said chamber;
   c. lateral offset means connected to a near uphole end of said pipe;
   d. means connected to lateral offset means for delivering to said chamber through said lateral offset means and said pipe, a combustible gas mixture of a predetermined amount;
   e. ignitor means mounted in said offset tube means;
   f. means electrically connected with said ignitor means for energizing said ignitor means to initiate combustion of said mixture whereupon a combustion wave travels through said pipe through said firing chamber and strikes said impact surface to said liquid to generate a seismic disturbance;
   g. length/diameter ratio of said pipe being within a range to support said wave at supersonic speed;
   h. said firing chamber having a tapered end section connected to said pipe to re-establish said combustion wave therein after emergence from said pipe;
   i. time break indicating means attached to said firing chamber to indicate the occurrence of the passing of said combustion wave relative to said chamber;
   j. additional digital data responsive control means connected to parallel with said delivery means and said energization means connected to a time code generating means remotely positioned to said additional digital data responsive control means, for generating, in sequence, in accordance with a digital time source code, control signals for sequentially (1) controlling said delivery means to cause delivery to said elongated pipe and said elongated enlarged firing chamber of said predetermined amount of gas, and (2) actuating said energization means so as to energize said ignitor means, said digital source code constituting digital signals representative of multi-bit digital data timing words and a plurality of clock pulses, said remotely positioned time code generating means including gate means responses to said time break indicator means whereby said gate means is held in the enabled state for a predetermined duration to ensure detection of all significant seismic reflection signals after generation of said seismic disturbance, said additional digital data responsive control means including time decoding means for decoding said digital source code, first relay means electrically connected to said time decoding means and operative thereby to control said delivery means, so as to cause delivery along said elongated pipe and said firing chamber of said predetermined amount of said gas mixture, second relay means electrically connected to said decoding means and operated to control and cause actuation of said energization means in accordance with the occurrence of an operational coded event, said time decoding means of said additional digital data control means including:
   k. control means comprising start/stop/restart signal generating means and switch network means controllably connected thereto, said control means capable of generating digital signals for initiating, stopping and restarting delivery of gas and energization thereof within said system in accordance with the status of said switch network means;
   l. timing counter means connected to control means (k) and, including additional switch network means, said timing counter means accumulating clock pulses from a source of said pulses to provide a plurality of digital signals in accordance with switch conditions of said additional switch network means;
   m. control signal generating means including gate means selectively responsive to digital signals from control means (k) and timing counter means (l) as well as digital signals indicative of a multi-bit digital data timing word passing through control means (k) for generating at least first and second groups of control signals in which said first group sequentially controls said first and second relay means and hence the occurrence and duration of delivery as well as ignition of said gas within said pipe and chamber;
   n. cyclic record counting means including yet additional switch network means and gate and counter means responsive to digital signals from control means (k) which indicate each shooting cycle and compare the indicated cycle to an encoded ending cycle value in accordance with conditions of said yet additional switch network means, said record counting means also including a digital signal generating means responsive to digital signals from said gate and counter means thereof as well as to said second group of control means generated by control signal generating means (m) to provide a cycle re-initiation digital signal;

o. reset logic means including a series of gate means responsive to at least said cycle re-initiation digital signal from record counting means (n) to provide a series of set and reset digital signals for circuitry (k)–(n) for setting said (k)–(n) circuitry to preselected initial conditions whereby the seismic shooting cycle can be automatically repeated without interruption until said ending cycle value encoded in record counting means (n) is attained.

2. The system of claim 1 in which said temperature conditional interrupt circuit means includes additional interruption means for controllably interrupting said switch network means of control means (k) of said additional digital response control means.

3. The system of claim 1 in which said switch network means of control means (k) includes first separate switch conditions means for controlling starting, stopping and restarting of said signal generating means to provide delivery or ignition of gas within said pipe without repeating previously performed functions, and second separate switch condition means for dumping previously performed functions and restarting the system at time zero.

4. The system of claim 1 with the addition of a temperature conditional interrupt means operative at said lateral offset means to detect the occurrence of a selected high temperature condition therein and to generate a control signal in response thereto for disconnectably connecting said delivery means from said pipe to interrupt operations thereof independent of said additional digital response control means.

* * * * *